United States Patent Office 3,117,230
Patented Jan. 7, 1964

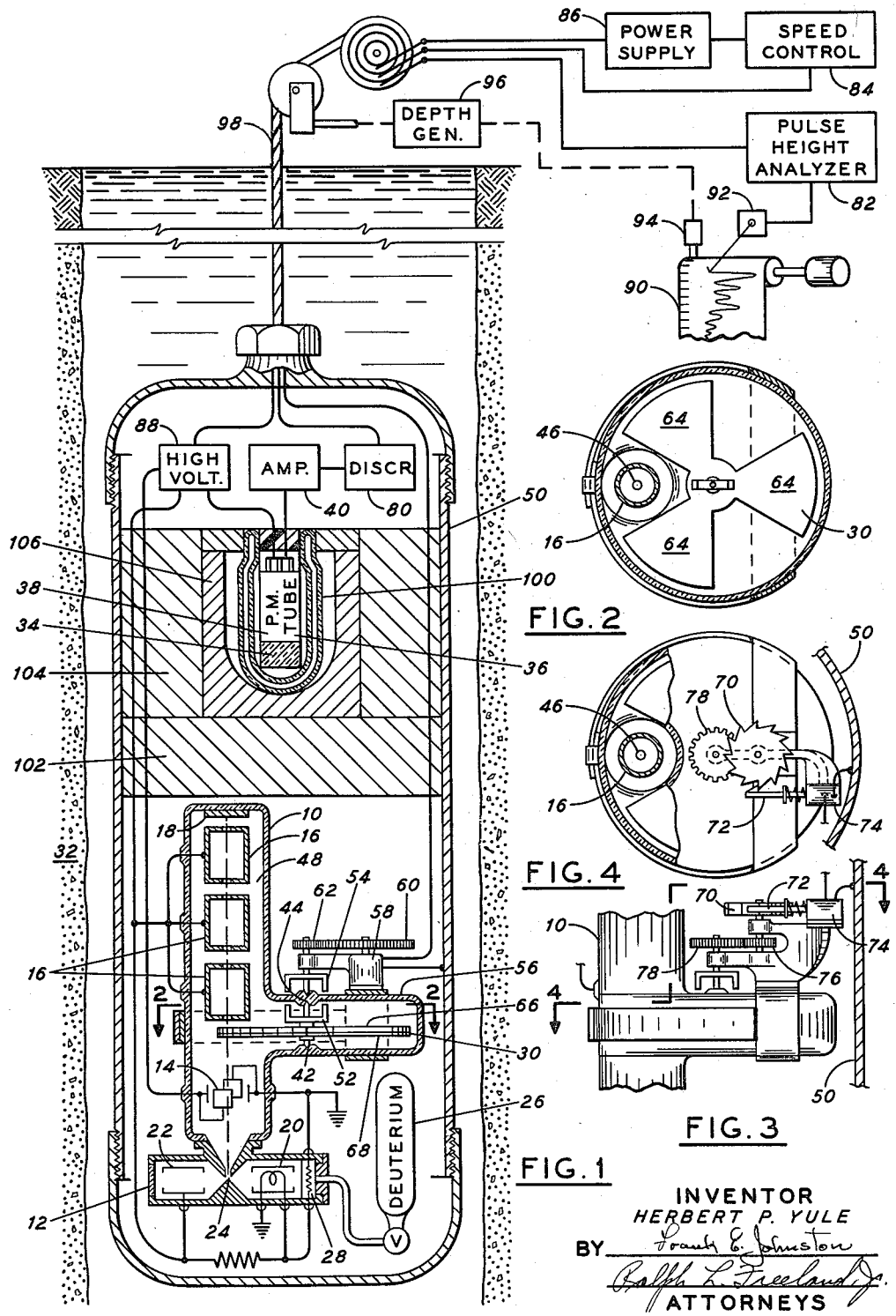

3,117,230
ACCELERATOR TYPE NEUTRON SOURCE WITH SHUTTER MOUNTED BETWEEN THE DRIFT TUBE AND THE FOCUSING MEANS
Herbert P. Yule, Anaheim, Calif., assignor to California Research Corporation, San Francisco, Calif., a corporation of Delaware
Filed Aug. 5, 1959, Ser. No. 831,747
5 Claims. (Cl. 250—84.5)

The present invention relates to nuclear particle accelerators of the linear type. More particularly, it relates to linear accelerators for generating neutrons in bursts or pulses not exceeding about 100 milliseconds' duration in a wall bore to permit irradiation of constituent nuclei in an earth formation traversed by a well bore at preselectable time periods to identify the relative quantities of such nuclei by time-sequential gamma-ray spectroscopy.

The invention has for an object the generation of neutrons by the deuterium-tritium (D-T) process in accurately timed pulses to permit detection of inelastically scattered gamma rays and thermal-capture gamma rays from various nuclei in an earth formation without simultaneous generation of large numbers of low-energy neutrons by the deuterium-deuterium (D-D) process. In accordance with said object, means are provided for mechanically interrupting a beam of charged particles as they traverse an elongated accelerator tube from an ion source capable of producing a beam of charged particles, comprising either deuterons or tritons immediately ahead of the target means containing nuclei of the other species of nuclei to produce the D-T reaction. In a preferred form, said shutter means is formed as a circular disc having pie-shaped openings therein, and motor means continuously rotate the shutter into and out of the path of said beam. Alternatively, the shutter is rotated intermittently. Desirably, the shutter means has a low gravitational mass and is constructed of aluminum to permit its rapid acceleration and deceleration. Further the beam-contacting surface is coated with a material having a relatively high Z and a low surface-adsorption coefficient for particles accelerated in the beam, so that particles intercepted by said shutter means do not form a secondary target for the generation of neutrons by the D-D reaction or the tritium-tritium (T-T) process, both of which produce low-energy neutrons and for which there is greater probability for the reaction to occur than the D-T process.

In the development of nuclear spectra from an earth formation traversed by a well bore, it is known to irradiate the formation with a source of fast neutrons such as those produced by the D-T process, since this reaction yields neutrons of about 14 mev. energy. Such fast neutrons can produce gamma rays by the inelastic scattering process by nuclei of both oxygen 16 and carbon 12, as well as other nuclei present in subsurface formations. Carbon and oxygen, of course, are definitive in an earth formation as to the potential presence of water or oil in the earth formation. While static, nonlinear or diffusion-type generators for the D-T process are known in the art, these generators usually comprise an ion source such as an electron-emitting cathode, a gas leak to admit deuterium, an accelerating screen and a target containing tritium, all within an evacuated tube. However, such generators normally require replacement at frequent intervals because of the contamination that results from the small amount of deuterium gas being continually released into the accelerator. Alternatively, such generators require a continuous evacuation system to maintain vacuum, while deuterium gas is being released, or a large amount of getter material must be used in the generator.

Where none of the foregoing precautions are taken, the diffusion-type generator rapidly deteriorates by deuterium in the form of neutral particles collecting on the various surfaces of the generator and quickly deteriorating the generator into a D-D type rather than the preferred D-T. The D-D reaction in general produces neutrons of about 4 mev. Since two important events in oil well logging are the production of the inelastically scattered gamma rays of carbon, at 4.41 mev., and of oxygen, at 6.1 mev., such nuclear events cannot be initiated with D-D reaction neutrons of this low value. More generally, 14-mev. neutrons are more penetrating than 4 mev. neutrons, and this allows one to observe a larger fraction of thermal-capture events occurring deeper in the formation and beyond the invaded zone.

Accordingly, it is necessary that all precautions be taken to avoid generation of the D-D reaction in a neutron generator. While diffusion generators of the type mentioned above will produce the D-T reaction at relatively low electrical potentials between the electrodes, the paths for travel of the charged particles from the electron source toward a target is not well defined in such generators, so that accurate pulsing of the neutron source is not possible. That is to say, the rate at which the neutron source for irradiating the formation can be modulated from a relatively high value to a negligible value cannot be sharply initiated and sharply cut off to form well-defined pulses of neutrons to the source. One of the reasons for this is that the charged particles are emitted by the ion source in a relatively random fashion by bombardment of neutral gas particles with a cloud of electrons emitted by a thermal source.

While flow of thermal electrons can be accurately controlled, the interaction of these electrons with neutral gas particles cannot be, and, accordingly, irradiation of the target with such charged particles is at best a slowly varying function when measured on a microsecond scale. Such accuracy of pulsing is required in time-sequential gamma-ray spectroscopy because of the rate at which fast neutrons become thermalized in an earth formation. Such thermalization of fast neutrons occurs in a period of less than about 50 microseconds so that if inelastically scattered gamma rays are to be detected without interference by thermal neutron-capture gamma rays it is desirable to be able to pulse the neutron source rapidly from a full-on to a full-off condition in about one microsecond period.

For the foregoing reasons, it is desirable that a linear accelerator, wherein the charged-particle beam can be accurately controlled as to its starting and stopping time relative to a target, be used in time-sequence gamma-ray spectroscopy. In such a system, the ion source generates charged particles which are linearly accelerated through one or more drift tubes and focusing plates toward a fixed target of well-defined dimension and path for the charged particles. As compared to a diffusion-type generator wherein a single electrical field controls the emission of thermal electrons and the opposite flow of charged particles toward a target, the linear accelerator can readily control the pulsing of the charged particles that strike the target plate to generate neutrons.

While it has been proposed heretofore in linear accelerators to deflect the charged-particle beam by use of focusing electrodes placed ahead of the drift tubes in a linear accelerator or at the output of a charged-particle beam, such as a Van de Graaff generator, the simple deflection of a charged-particle beam from the target results in such charged particles being effectively sprayed or otherwise dispersed around the interior surface of the generator. Such dispersion, unless the vacuum system is of high capacity and greatly in excess of that required for the size of the accelerator, normally results in neutral deuterium atoms being formed on the surfaces of the neutron generator, so that upon subsequent striking of charged deuterons on the particles there is readily generated the D–D reaction that is not desirable and considerably confuses the picture that is desired to irradiate an earth formation of unknown nuclei with neutrons of a particular value, namely 14 mev.

For the foregoing reasons, I have found it desirable to be able to interrupt the beam of charged particles with a shutter means that can accurately and positively initiate and interrupt the bombardment of a target, such as tritium target, with charged particles, such as deuterons. In accordance with the invention, such shutter means are interposed between the focusing electrodes and the accelerating or drift tubes of a linear accelerator. As described hereinbefore, such shutter is desirably formed of low-mass material, such as aluminum or magnesium, so that it may be readily accelerated and decelerated, whether it is continuously rotated or intermittently moved, by any suitable mechanical drive means. Desirably, of course, the shutter means is within the vacuum space formed for the neutron generator, and the movable shutter means is moved by remote control, such as an external drive means of the magnetic type. In addition to the target being formed of a low-mass material, it desirably has a coating of material which has a relatively low surface-adsorption characteristic for particles accelerated in the beam. Desirably, such material is lead or cadmium.

Further objects and advantages of the present invention will become apparent from the following detailed description taken in conjunction with the accompanying drawings, which form an integral part of the present application.

In the drawings:

FIG. 1 is a vertical, cross-sectional view of a logging instrument incorporating a neutron generator with a mechanical pulsing system of the type contemplated by the present invention and indicates schematically a method of detecting and recording time-sequential gamma-ray spectra representative of an earth formation irradiated by the neutron source.

FIG. 2 is a partial plan view through the shutter mechanism, illustrated in FIG. 1, and taken in the direction of arrows 2—2.

FIG. 3 is a partial vertical view of the exterior of an alternative shutter mechanism, similar to that shown in FIGS. 1 and 2, for intermittently rotating, or oscillating, the shutter mechanism.

FIG. 4 is a plan view, partially in cross section, taken in the direction of arrows 4—4 in FIG. 3, which illustrates the intermittent-motion mechanism.

Referring now to the drawings, and in particular to FIG. 1, there is illustrated a borehole accelerator for generating neutrons of the D–T-reaction type adapted to be pulsed in bursts or modulated at a relatively rapid rate— for example, not less than about 200 times per second. Said linear accelerator is designated by the numeral 10. The operating elements of such a generator comprise an ion source, identified generally as 12, focusing plates 14, a plurality of drift tubes 16, and a target 18. Target 18 in the present arrangement is preferably formed of a material such as zirconium that has absorbed therein tritium gas, so that upon irradiation by, or acceleration of, deuterons, neutrons are produced from the target in profusion and at an energy of about 17 mev.

The charged particles accelerated through generator 10 from ion source 12, focusing plate 14 and drift tube 16 comprise in general a thermal electron source, such as the indirectly heated cathode, designated generally as 20, and anode section 22 positioned relative to electron source 20, so that electrons are pinched through the gap indicated as 24. During this pinching operation, free deuterium gas admitted from deuterium gas reservoir 26 and admitted through a thermally operated palladium leak 28 enters the space around the electron source 20, and in the process of collision with the thermal electrons accelerated through gap 24 by anode 22 some of these neutral gas particles of deuterium are ionized to form positively charged deuteron particles.

For the purpose of explaining why it is important to be able to energize and de-energize the target 18 by bombardment of charged deuteron particles through a rotating shutter means such as shutter element 30, a brief explanation of time-sequence neutron-bombardment gamma-ray spectroscopy is now in order. When a formation, such as 32, of heterogeneous materials and unknown nuclei is being bombarded with fast neutrons, the fast neutrons slow down to thermal energies by collision with certain nuclei in this material. After slowing down sufficiently to thermal energies, the neutrons eventually disappear by thermal-capture process within the nucleus of the same material.

The probability for interaction of fast neutrons and thermal neutrons is quite different for the same nucleus, and where many different nuclei of unknown character are present in the formation the competing processes become so confusing that it is difficult, if not impossible, to detect the origin. This is particularly true with the process known as gamma-ray spectroscopy because only a few of the gamma rays, generated by the nuclei of one species interacting with neutrons, arrive at scintillation crystal 34 with either the original energy of the gamma ray, or at least a characteristic energy, such as the pair-production peak, so that the presence of that particular species can be definitely identified in the spectra.

One means for separating the gamma rays produced by inelastic scattering of fast neutrons and those produced by thermal neutron-capture has been the gating of the discriminator to accept electrical pulses from the amplifier only during a selected portion of the neutron pulse. The methods proposed heretofore for pulsing the neutron generator have been discussed above, and their inefficiencies have been fully described. The detection of inelastically scattered gamma rays is particularly desirable because oxygen and carbon, both of which can indicate the presence of water or oil in earth formation 32, yield gamma rays upon bombardment with the fast neutron source that are very similar to those given off by calcium, silicon, chlorine, and other nuclei commonly present in sedimentary formations that interact with high probability by the thermal neutron-capture process.

The time required for fast neutrons to become thermalized is of the order of 10 microseconds, so that it is vital that the generator have a rapid rise and decay time for proper pulsing. Particularly, the rise time is essential, since a high output of fast neutrons instantaneously emitted at the start of each cycle, rather than a gradual increase, is vital to a high-flux density in the early portion of each cycle. Termination of the pulse is not so vital because the scintillation counter 38, including crystal 34 and photomultiplier tube 36, may be controlled through gate or amplifier 40 to terminate the counting period at any desired time within the 10 microsecond range. Accordingly, it will be understood that pulsing of the generator should be as sharp as possible, and for this reason it is essential that a more positive turn-on and turn-off time be provided than is possible with an electronic control of diffused deuterons, has has been proposed heretofore.

In accordance with the present invention, the sharp turn-on, turn-off time is provided by shutter means 30, which is, as indicated, rotatably mounted on a pair of pivot points 42 and 44 and, as indicated in FIG. 2, is circular in shape with three pie-shaped segments omitted from the circle so that the shutter may be continuously rotated to pass through and out of the beam transmitted along the axis of drift tube 16. The flow is generally through the opening designated as 46.

In the embodiment of FIGS. 1 and 2, the shutter means 30 is driven by remote operation so that the evacuated space is not contaminated, as might result if the drive means were within the vacuum space, designated as 48. Hence, neither additional gettering means nor down-hole evacuation means are required within logging sonde 50. In the present embodiment, remote drive of shutter means 30 is indicated as through a pair of horseshoe magnets indicated generally as 52 and 54. Horseshoe magnet 52 is, of course, directly coupled to shutter 30 within evacuated space 48, while horseshoe magnet 54 is driven from the outside and in close coupling through side wall 56 of the neutron generator 10. The side wall is indicated as being made of glass, but any other nonmagnetic material would be quite satisfactory for its construction and desirably may be made of stainless steel. Drive of the shutter means 30 through the horseshoe magnets 52 and 54 is indicated as being through a small drive motor 58 and gear and pinion means 60 and 62, respectively. It will be understood, of course, that the control of drive motor 58 will be made such that it is synchronous at the desired rate for movement of shutter means 30 and its pie-shaped segments 64 into and out of the beam of deuterons.

Shutter means 30, as stated hereinbefore, is desirably made of a light weight material such as aluminum or magnesium. This portion is indicated as being on the "downstream" side of the deuteron beam and is indicated generally as 66 in FIG. 1. A relatively thin coating 68 of material having a high Z and low adsorptivity for hydrogen isotopes, such as lead or cadmium, is then placed over the surface of the basic metal forming the shutter means. The purpose of this material is to stop the deuteron beam without adsorption of deuterium into the material. The latter function is quite vital to the operation of the present structure, since adsorption of deuterium onto a shutter mechanism of this type would form directly a deuterium target, and would permit a D-D reaction to proceed at this surface when the beam is intercepted. The difficulty with such an arrangement is that it yields a considerable number of neutrons of low energy. The D-T reaction yields neutrons of about 14 mev., while the D-D reaction yields only neutrons of about 4 mev. Additionally, the analysis of gamma radiation when only a single-energy neutron is emitted eliminates unnecessary confusion in the resulting spectra emitted by an unknown formation. It will also be understood that the present invention is useful in detecting and measuring the flux of neutrons at any desired location or energy after interaction with the earth formation and its fluids.

FIGS. 3 and 4 represent an alternative arrangement to that shown in the embodiment of FIGS. 1 and 2. In the latter embodiment, the rotating shutter mechanism is intermittently operated through the ratchet and unidirectional gear means designated by ratchet wheel 70 and the pawl 72, which is operated by solenoid 74. Transmission of the intermittent motion of the ratchet and pawl means is by a similar gearing and drive means indicated generally by gears 76 and 78. Alternatively, it will be understood that the shutter may oscillate instead of rotate.

The intended operation of the circuitry and the neutron generator constructed in accordance with the present invention has been discussed hereinbefore, with the exception of the means for traversing the well bore with the logging sonde and with the neutron generator operating in synchronism with the time-sequential analysis of gamma rays generated within formation 32. As indicated hereinabove, the scintillation counter 38 is sequentially operated in synchronism with the neutron generator through amplifier 40. The discriminator for 80 is, of course, adapted to select a particular energy of electrical pulse generated within photomultiplier tube 36 and amplifier 40, so that only gamma rays containing meaningful information is transmitted for recording on the pulse-height analyzer 82. It will be understood that any suitable pulse-height analyzer may also be incorporated within the logging sonde in a manner described in Patent No. 2,856,537 by Clark and Patent No. 2,802,951 by Seevers. However, in the present embodiment a pulse-height analyzer is positioned at the earth's surface, as indicated. Additionally, the pulse-height analyzer, where it is arranged to detect a plurality of different sets of gamma-ray spectra in each pulse of the neutron source, may be of the type disclosed in the application of Seevers, Jones and Meyerhof, Serial No. 699,657, now abandoned. Synchronism of drive motor 58, as in FIGS. 1 and 2, or the ratchet means 74, in the embodiment of FIGS. 3 and 4, with a gamma-ray detection system is provided by speed controller 84. Power supply 86 operates controller 84 and also supplies high-voltage source 88 within logging sonde 50. Readout of the pulse-height analyzer is, of course, provided by the paper record 90 and oscillograph 92. The correlation of the pulse-height analyzer with depth is recorded on paper chart 90 by depth indicator 94 operated through depth generator 96 that measures the position of logging cable 98.

As indicated schematically, the scintillation counter 38 is thermally shielded within a Dewar flask 100, and the entire arrangement of scintillation counter is suitably shielded from thermal neutrons and gamma rays of undesired origin arising either within the formation or the logging sonde itself. Bismuth shields such as discs 102 and cylinder 104 perform the function of excluding lower-energy gamma rays. An inner shield of boron 106 protects the crystal from thermal neutrons.

From the foregoing description it will be apparent to those skilled in the art that various modifications and changes can be made in the disclosed embodiments without departing from the invention. Thus, the invention is intended to be interpreted relative to said modifications in accordance only with the scope of the appended claims.

I claim:

1. A borehole accelerator for generating fast neutrons by the deuterium-tritium process in bursts not exceeding about 100 milliseconds duration without interference from deuterium-deuterium or tritium-tritium process generated neutrons which comprises means forming an elongated accelerator tube, said tube being evacuated for the acceleration of nuclear particles therein, an ion source for generating a charged particle of the class consisting of deuterons and tritons, means for accelerating said ions axially through the length of said accelerator tube, target means having impregnated therein atoms containing nuclei of the other of said group consisting of deuterons and tritons, said accelerating means including drift tube means and focusing means, and shutter means interposed between said drift tube means and said focusing means, said shutter means including a surface coated with a material having a relatively high Z and a low surface adsorption characteristic for said charged particles and mechanical means for inserting into and removing from the beam path through said tube said shutter means so that said coated surface is contacted by said charged particles from said ion source, said mechanical means being operable at a rate of not less than about 200 times per second and the duration of said beam between interruptions being not greater than about 10 milliseconds per burst.

2. Apparatus in accordance with claim 1 wherein said shutter means includes a substantially circular disc having pie-shaped openings formed therein and said mechanical means includes motor means for continuously rotating said shutter means into and out of the path of said beam, the axis of rotation of said shutter means being substantially parallel to said beam.

3. Apparatus in accordance with claim 1 wherein said shutter means is constructed of metal selected from the group consisting of aluminum and magnesium, and said coated surface material having a relatively high Z and a low surface adsorption for particles accelerated in said beam and said material being selected from the group consisting of lead and cadmium.

4. Apparatus in accordance with claim 1 wherein said shutter means is intermittently rotated by means including solenoid-actuated means, said intermittent motion being applied to said shutter means at a rate of about 200 motions per second and duration of each burst is not over about 50 milliseconds long.

5. A neutron generator of the deuterium-tritium type useful in the production of inelastically scattered gamma rays in detection of carbon and oxygen in earth formations traversed by a borehole, wherein said inelastically scattered gamma rays are detected by rapid pulsation of the neutron source, and said gamma rays are detected before the thermal neutron-capture gamma-ray flux exceeds the gamma rays produced by inelastic scatter process, said generator comprising a source of deuterons positioned adjacent one end of an accelerating tube, said accelerating tube being evacuated for the linear transmission of said deuterons as a beam under an electrical field toward a tritium target, said tritium target being positioned at the opposite end of said tube, drift tubes for accelerating said deuterons between said source and said tritium target, a movable shutter to interrupt said beam positioned between said deuteron source and said drift tubes, said shutter comprising a low-inertia base material and a surface coated with a material selected from the group consisting of lead and cadmium to reduce adsorption of deuterium thereon, and means for oscillating said shutter into and out of the beam path of said neutron generator at a rate sufficient to maintain each burst of deuterons on said tritium target for a time not less than about 10 microseconds and not more than 10 milliseconds whereby neutrons are generated by said target for a period of time related to that required for said neutrons to become thermalized within an earth formation surrounding said generator.

References Cited in the file of this patent

UNITED STATES PATENTS

| | | |
|---|---|---|
| 2,275,748 | Fearon | Mar. 10, 1942 |
| 2,303,688 | Fearon | Dec. 1, 1942 |
| 2,576,600 | Hanson | Nov. 27, 1951 |
| 2,769,096 | Frey | Oct. 30, 1956 |
| 2,867,728 | Pollock | Jan. 6, 1959 |
| 2,905,826 | Bonner | Sept. 22, 1959 |
| 2,991,364 | Goodman | July 4, 1961 |

FOREIGN PATENTS

| | | |
|---|---|---|
| 1,045,128 | Germany | Nov. 27, 1958 |
| 724,441 | Great Britain | Feb. 23, 1955 |

OTHER REFERENCES

Los Alamos Scientific Laboratory Report LAMS–2215, April 29, 1958.